(No Model.)

A. A. FÜRST
WHEEL TIRE.

No. 593,463.  Patented Nov. 9, 1897.

Witnesses

Alfred Alexander Fürst
Inventor
By John J. Halsted & Son
his Attorneys

United States Patent Office.

ALFRED ALEXANDER FÜRST, OF LONDON, ENGLAND.

WHEEL-TIRE.

SPECIFICATION forming part of Letters Patent No. 593,463, dated November 9, 1897.

Application filed January 4, 1897. Serial No. 617,902. (No model.)

*To all whom it may concern:*

Be it known that I, ALFRED ALEXANDER FÜRST, a subject of the Emperor of Germany, residing at London, England, have invented new and useful Improvements in Wheel-Tires, of which the following is a specification.

This invention relates to that class of tires in the construction of which a tube of celluloid, xylonite, or other suitable hard but more or less yielding or resilient material is used.

In carrying out my present invention I employ in combination with the said celluloid or other substantially non-expansible tube a cover of suitable material in the form of a sheet, and between the lower part of this cover and the tubular celluloid or equivalent hard tire I provide an expansible bag or chamber, of rubber or other suitable material, and means for inflating and expanding this bag with air.

To enable my invention to be fully understood, I will describe the same by reference to the accompanying drawings, in which—

Figure 1:
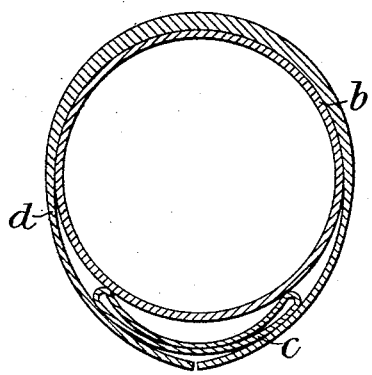
Figure 2:
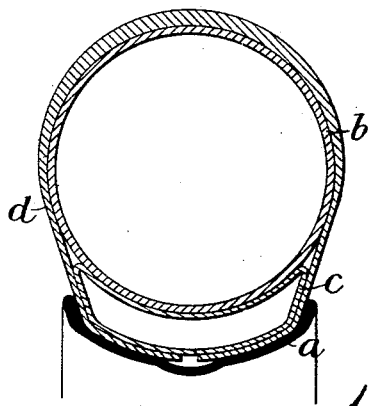

Figure 1 represents a transverse section of a tire made according to my invention, and Fig. 2 a similar view showing the tire applied to a wheel-rim.

In the drawings, $a$ represents an ordinary wheel-rim; $b$, the tube, of celluloid, xylonite, or other suitable hard but more or less yielding or resilient material, constructed in the ordinary and well-known manner.

$c$ is the bag or chamber, of rubber or other suitable material, capable of being inflated with air in the usual manner, and $d$ is the cover, of suitable material. The interior of tube has no communication with the interior of the expansible bag $c$, and the inflation of this bag therefore in no wise causes any inflation or any expansion whatever of the hard tube $b$.

To apply my tire to the rim $a$ of a wheel, the tubular tire $b$, the internal diameter of which is by preference slightly smaller than the external diameter of the flanges of the rim, is placed within the cover $d$, and between the tire $b$ and the under part of the cover I place the air-bag $c$. The edges $e$ $e$ of the cover are then connected in any suitable manner, so as to inclose both the celluloid tire and the air-bag, as shown in Fig. 1, and so that the inflation of the air bag or ring shall, if need be, allow the edges of this cover to spread a little apart, as shown in Fig. 2. In adapting the complete tire thus formed to a wheel-rim it is placed on or sprung over the rim $a$, the air-bag $c$ being between the tire $b$ and the rim $a$. The air-bag $c$ is then inflated and forces the lower part of the cover $d$ against the rim, so as to fix the tire in position. By this combination I obtain a tire which is very light and which possesses the advantages of a combined cushion and pneumatic tire, the cushion or air-bag being protected from risk of puncture.

Having now particularly described and ascertained the nature of my said invention and in what manner the same is to be performed, I declare that what I claim is—

1. A tire for wheels, consisting of a rigid, main, tubular ring or hoop, circular in cross-section and made of celluloid, xylonite or other suitable hard material more or less yielding, of a smaller inflatable bag or chamber in direct contact with such ring and adapted when inflated to conform itself to the contour of such ring and also to conform to the contour of the groove of the wheel-rim, and of a flexible covering inclosing such ring and bag.

2. The combination with a wheel-rim, of a tire composed of a tubular ring or hoop of celluloid, xylonite or equivalent hard but somewhat resilient material, of an inflatable annular bag located directly beneath and in contact with such hoop, and of an outer covering serving to inclose both the tube and bag in such relative positions, and thus to protect the bag from damage or puncture, and yet permit the cover to adapt itself thereto, the inflation serving to force the lower part of such cover against the wheel-rim.

ALFRED ALEXANDER FÜRST.

Witnesses:
G. F. REDFERN,
A. ALBUTT.